US005955731A

United States Patent [19]

Bergmann et al.

[11] Patent Number: 5,955,731

[45] Date of Patent: Sep. 21, 1999

[54] MASS SPECTROMETRIC ANALYSIS OF SURFACES

[76] Inventors: Thorald Horst Bergmann, Buchenweg 9a, D-82441Ohlstadt; Claus-Peter Michael Heidmann, Almrauschstrasse 14a, D-82031 Gruenwald, both of Germany

[21] Appl. No.: 08/969,528

[22] Filed: Sep. 5, 1997

[30] Foreign Application Priority Data

Sep. 13, 1996 [DE] Germany ........................... 196 37 480

[51] Int. Cl.[6] .................................................... B01D 59/44

[52] U.S. Cl. ........................................ 250/288; 250/423 P

[58] Field of Search ................................ 250/288, 288 A, 250/423 P

[56] References Cited

U.S. PATENT DOCUMENTS

| | | | |
|---|---|---|---|
| 3,644,731 | 2/1972 | Eloy | 250/288 |
| 4,208,585 | 6/1980 | Vogt | 250/288 |
| 4,740,692 | 4/1988 | Yamamoto | 250/288 |
| 5,118,937 | 6/1992 | Hillenkamp et al. | 250/288 |

FOREIGN PATENT DOCUMENTS

| | | |
|---|---|---|
| 3 439 287 | 5/1985 | Germany . |
| 2 749 569 | 6/1985 | United Kingdom . |

OTHER PUBLICATIONS

B. Spengler et al.: Gentle probe for tough molecules: matrix–assisted laser desorption mass spectrometry Analusis, 1992, pp. 97–101, vol. 20 Elsevier, Paris.

M.S. De Vries et al.: Photoionization mass spectrometer with a microscope Laser desorption source Review of Scientific Instruments, 1992, pp. 3321–3325, vol. 63(6), American Institute of Physics.

P. Voumard et al.: A new instrument for spatially resolved laser desorption/laser multiphoton ionization mass spectrometry Review of Scientific Instruments, 1993, pp. 2215–2220, vol. 64 (8) American Institute of Physics.

T. Fanibanda et al.: Thin layer chromatography–mass spectrometry using infrared laser desorption International Journal of Mass Spectrometry and Ion Processes, 1994, pp. 127–132, vol. 140, Elsevier Science B.V.

A.N. Krutchinsky et al.: Thin–layer Chromatography/Laser Desorption of Peptides Followed by Multiphoton Ionization Time–of–flight Mass Spectrometry Journal of Mass Spectrometry, 1995, pp. 375–379, vol. 30, John Wiley & Sons, Ltd.

*Primary Examiner*—Kiet T. Nguyen

[57] ABSTRACT

A mass spectrometric analysis of the content of surfaces, it is necessary to bring the analyte molecules into the gas phase. This is done with a tightly focused, preferably pulsed laser beam. This laser beam is focused onto the surface with a mirror that is placed as close as possible to the analysed surface. In order to achieve a very small focal point, deflection and focusing of the laser beam is done with a single optical element. The evaporated material passes through a opening in the mirror into the mass spectrometer. It is also possible to let the evaporated material pass right next to the mirror into the mass spectrometer.

9 Claims, 4 Drawing Sheets

MASS SPECTROMETRIC ANALYSIS OF SURFACES

BACKGROUND OF THE INVENTION

1. Field of the Invention

This invention relates to an apparatus and a method to analyse the surface content of a solid state sample by mass spectrometric means.

Often it is necessary to analyse the content of a surface of some solid state sample. This can be done by bringing the substances contained by the surface into the gasphase preferably by evaporating some of the material off the surface. Some of this material must then be entered into a mass spectrometer and be ionized there. Some methods of analysis combine the two steps of evaporation and ionization into a single step, some other methods perform these steps separately.

In a time-of-flight mass-spectrometer the extraction volume is that region within the ion source of the mass-spectrometer, from which, upon start-time, ion paths lead to the surface of the detector of the time-off-light mass-spectrometer. The paths of the ions are given by the electrical fields and the physical laws of motion within.

The start-time of time-of-flight analysis can be given by:

the point of time, when neutral particles of a gas are ionized within the extraction volume by a laser or electron beam crossing it.

the point of time when the electrode voltages of the ion source are switched on. This is usually the case when ions are to be analysed, since ions can only reach the extraction volume, when the voltages on the electrodes of the ion source are switched off.

Stated generally, the extraction volume is that region of space within the mass spectrometer, where ions have to be existant or must be produced, if they should give some signal on the detector of the mass spectrometer upon mass analysis.

2. Description of Related Art

State of the art shows a number of methods for bringing substances contained in thin surface layers into the gas phase and ionizing them. An example of this method is MALDI (Matrix Assisted Laser Desorption Ionization). Here the analyte substance is mixed into a "matrix", e.g. nicotinic acid, and coated onto a surface. After drying this sample can be introduced into a mass spectrometer. The principle of this method is that the matrix strongly absorbs at the wavelength of the laser desorbing this material. When a laser pulse strikes the surface a small portion of it will explode into the mass spectrometer. Since the analyte molecules are contained within the exploding matrix they also will be swept into the mass spectrometer. The analyte molecules can be ionized by this process of desorption or it is also possible that they are already present in ionized state within the matrix layer. In either case they are detectable by this process in a mass spectrometer. An overview of this method can be found in the publication of B. Spengler et al. (Analusis, vol. 20, pages 91–101, 1992).

Often desorption from the surface and ionization of the analyte molecules are two distinct processes. Specifically this is the case when the analyte substance are only present in neutral state in the surface material or cannot be ionized during the process of desorption with sufficient probablity. M. S. de Vries et al. (Review of Scientific Instruments, vol. 63, pages 3321–3325, 1992) use an UV-laser for desorption which is focused onto a spot of micrometer diameter by a microscope objective. The substances desorbed from this spot are ionized by a further laser and detected in a time-of-flight mass spectrometer. P. Voumard et al. (Review of Scientific Instruments, vol. 64, pages 2215–2220, 1993) also use two lasers, one for the desorption, the other for detection. However they use as desorbing laser instead an infrared laser.

Another way of separating the processes of desorption and ionization is to use one laser to bring the analyte substances in the gas phase, then using a pulsed gas beam to transport the analyte substance to some other location, ionizing them at that other location with a second laser pulse. This method can be advantageous when large amounts of unwanted material are also produced in the process of vaporization. This method can also be used to cool the analyte substances, when their detection and spectroscopic analysis is done by resonant multiphoton ionization. This variant of the method can be used for the analysis of thin-layer chromatographic plates.

Thin-layer chromatographic plates usually have dimensions in the order of 10 cm×10 cm. They are made of some inert base material onto which as transport layer e.g. a layer of silica gel is coated.

A mixture of analyte substances is coated near the edge of the plate in a start zone. After drying of the start zone the thin-layer chromatographic plate is inserted with the edge of the start zone into some suitable solvent. By means of capillary forces the solvent starts to climb up the plate taking the analyte substances along. According to their varying adsorption coefficients on the material of the transport layer the analyte substances follow the solvent motion with different velocities.

After some time the plate is removed from the solvent reservoir and dried. The dissolved substances will remain at their current location on the plate. Since these substances had different transport velocities on the transport layer they now will be on different locations on the plate with respect to the edge that was held into the solvent. It is of great interest to analyse these substances by mass spectrometric means.

T. Fanibanda et al. (International Journal of Mass Spectrometry and Ion Processes, vol. 140, pages 127–132, 1994) use a pulsed infrared laser to evaporate some silica gel together with the analyte substances from a slice of a thin-layer chromatographic plate. At the instance when the evaporated material is closely above the plate, it is swept by a pulsed $CO_2$ gas beam through a scimmer into a time-of-flight mass-spectrometer. When the analyte substances reach the ion optics of this mass spectrometer a second laser is fired to ionize the analyte substances. The ionizing laser operates at a wavelength of 266 nm, which is useful for ionizing a great variety of molecules via multiphoton ionization.

Likewise, A. N. Krutchinsky et al. (Journal of Mass Spectrometry, vol. 30, pages 375–379, 1995) also use a pulsed infrared laser to evaporate material from a slice of a thin-layer chromatographic plate. Just as T. Fanibanda et al. they transport the analyte substances with a pulsed gas beam into the ion optics of their time-of-flight mass-spectrometer. However, contrary to T. Fanibanda et al. they use a tunable UV-laser for ionization which allows a higher selectivity when ionizing the analyte molecules with resonant multiphoton ionization via intermediate electronic states.

A somewhat more general method of analysing substances contained in the surface of solid state samples is presented in the UK patent application GB 2 149569 A. In this method a deflecting mirror is positioned directly above the surface of the sample. The laser beam strikes this mirror in a direction essentially parallel to the surface of the sample and is then deflected onto the surface of the sample. Between mirror and sample a lens is positioned which focuses the radiation onto a small spot on the surface. Both elements, the lens and the mirror have openings through which desorbed substances can reach an analysing instrument e.g. a mass spectrometer.

The above examples have shown some of a multitude of methods for analysing substances contained in surfaces of solid state samples. However, all of these examples have drawbacks. The experimental arrangements of B. Spengler et al., M. S. de Vries et al., and P. Voumard et al. have the disadvantage that the analysed surfaces can influence the electrical field in the ion source of their time-of-flight mass-spectrometer. This makes the construction of the ion source and the sample holder more complicated, also restricting the size of the analysed samples. The surfaces on the sample holder can vary from one experiment to another, as a consequence modifying the electrical field in the ion source of the mass spectrometer. Modification of the electrical field can deteriorate the mass resolution and/or sensitivity of the instrument.

Using the arrangements of T. Fanibanda et al. and A. N. Krutchinsky et al. the thin-layer chromatographic plates must first be cut into small slices before analysis in the mass spectrometer. This must be done in order to come with the sample surface as close as possible to the gas beam, and also not to unduly influence the expanding gas beam. Even then only some small part of the evaporated material is actually taken along by the gas beam, causing a great reduction in sensitivity. Then, the distance from the pulsed gas nozzle into the ion optics of the mass-spectrometer is quite long, meaning that only a small solid angle of the total expansion will pass through the interaction zone of the ionizing laser beam.

As another disadvantage the silica gel layer will be evaporated off the thin-layer chromatographic plate with just a few shots of the evaporating laser:

a) This means that so much substance is evaporated with just one shot of the laser, that it would saturate the mass spectrometer by orders of magnitude, if all of that substance would actually enter the mass spectrometer.

b) Since each shot of the evaporating laser carries off these large amounts of material, the mass spectrometer shows a good signal even with losses on the transport path amounting to several orders of magnitude. Vice versa, if it is possible to reduce the amount of sample evaporated with one laser shot, then it also makes sense to reduce the losses on the transport path into the ion optics of the mass spectrometer.

c) Since one laser shot evaporates such large amounts of material from the thin-layer chromatographic plate, this process cannot take place in the vacuum chamber of the ion optics of the mass spectrometer without the gas pressure there rising to unacceptable values.

The same disadvantages will be found in an apparatus contructed following patent application GB 2 149 569 A. The lens shown in this arrangement will not be able to produce focal points less than a few 100 μm. Lenses, also infrared-transparent lenses generally have surfaces of spherical shape that will result in strong optical aberrations at short focal lengths. The most important optical aberration in this case, called spherical aberration, will cause a blurring of the focal spot to a few 100 μm. Silica gel, the most often used transport layer material for thin-layer chromatographic plates has an absorbtion length of a few 100 μm. Thus, also in this case it is to be expected like in the method of Fanibanda et al. that each laser shot will evaporate such large amounts of material that just a few shots will evaporate the complete silica gel layer at the respective location on the plate. Likewise, each laser shot will produce such amounts of gas, that residual gas pressure will rise to unacceptable values.

SUMMARY OF THE INVENTION

Thus it is an object of the invention to provide means and method for transporting analyte substances from the surface of a sample into the extraction volume of a time-of-flight mass-spectrometer. It is an object of the invention to provide an arrangement which only weakly influences the electrical field in the ion source of the time-of-flight mass spectrometer or better does not influence the electrical field there at all. It is another object of the invention to provide an arrangement for evaporating controllable amounts of substance from analysed surfaces, especially from thin-layer chromatographic plates. It is a further object of the invention to provide an arrangement that allows a high lateral resolution when analysing surfaces. It is a specific object of the invention to provide high sensitivity and mass resolution of the analysing mass spectrometer at the same time only evaporating small amounts of material from the analysed surfaces.

The characterizing features of the invention are given in claims 1 and 8.

In accordance with the invention the vaporizing laser beam strikes a deflecting mirror in a direction mainly parallel to the surface of the sample. The mirror then deflects the vaporizing laser beam onto the surface of the sample. This opens the possibility of striking the surface of the sample with a laser beam of large aperture. By being able to use a large aperture angle, even when using long wavelength lasers such as $CO_2$-lasers with 10 μm wavelength it is still possible to produce a focus of very small diameter.

The smaller the illuminated surface, the less is the amount of substance evaporated by a single laser shot. Using the generally for this purpose preferable infrared lasers with their wavelength of 10 μm, a focal diameter of only a few ten micrometers can only be achieved with a very large aperture angle. The necessity of this large aperture angle can easily be derived from the well-known Liouville theorem.

Focusing this laser beam onto a spot of just a few micrometers, the large aperture angle will result in a very small depth of focus. As a consequence of this very small depth of focus only material very close to the surface of the thin-layer chromatographic plates will be evaporated. In this manner the material from thin-layer chromatographic plates can be evaporated in a very slow and controlled manner.

In accordance with the invention this large aperture angle combined with a diffraction limited size of the focus on the analysed surface is achieved by placing a parabolic mirror, preferably an off-axis-parabolic mirror in close proximity above the analysed surface. This off-axis-parabolic mirror will deflect a laser beam, striking it in a direction parallel to the surface of the sample, such that it hits the thin-layer chromatographic plate symmetrical to it surface normal with a large aperture angle. Likely, it is possible to use a holographic optical element (HOE) which at the same time deflects and focuses the radiation of the laser beam. A holographic optical element is much cheaper to produce than an off-axis-parabolic mirror.

The evaporated material, together with the analyte substance can pass through a small opening in the off-axis-parabolic mirror viz. the holographic optical element into the extraction region of the mass spectrometer. This arrangement will allow keeping this distance between the surface of the sample, where the analyte substances are evaporated and the extraction region of the mass spectrometer very small. This will then result in a large effective solid angle above the evaporation point of the sample from which evaporated substances can reach the extraction volume, which will result in increased sensitivity of the mass spectrometer. Alternativly it is also possible to arrange the deflecting mirror such that the evaporated substances can pass right next to its rim into the mass spectrometer.

Using a holographic optical element for deflecting the laser beam, it is not mandatory to position this element in a 45°-angle to the laser beam, which opens another possibility of further reducing the distance between mirror and sample surface, which allows a further increase in the aperture angle of the radiation striking the surface of the sample. This further increase in aperture angle will then result in a further decrease in the size of the focal diameter of the spot on the sample surface. At the same time this larger aperture angle will further reduce the depth of focus of the focal point on the surface of the sample.

Since the laser beam now illuminates the deflecting mirror essentially parallel to the surface of the sample, it is now possible to mount the sample together with the deflecting mirror very close behind the ion source of a time-of-flight mass spectrometer, as seen in its direction of acceleration. An opening in the rear electrode of the ion source is then necessary for the entry of the evaporated substances into the time-of-flight mass-spectrometer.

In this manner it is possible to keep the distance between the sample surface and the extraction volume of the time-of-flight mass-spectrometer very small, at the same time preventing any influence on the electric field in the ion source of the mass-spectrometer by sample surface and/or the deflecting mirror. Even very large samples, such as thin-layer chromatographic plates can now be easily positioned behind the ion source of the mass spectrometer without influencing its electrical field.

As a preferred embodiment of the invention it is possible to mount the deflecting mirror on the rear side of the rear electrode of the ion source of the time-of-flight mass-spectrometer. This will further reduce the distance between sample surface and extraction volume of the time-of-flight mass-spectrometer. Mounting this mirror on the back of the rear electrode can be done by state-of-the-art methods and will not be further discussed here.

If the sample is arranged behind the ion source of the time-of-flight mass-spectrometer, different parts of its surface can be analysed just by moving it laterally behind the ion source. To find the focal point of the desorbing laser beam, it must only be moved from or to the rear electrode of the ion source. This movement can be effected by standard means, and will also not further be discussed here.

DESCRIPTION OF THE PREFERRED EMBODIMENTS

Some implentation examples of the invention will now be described in conjunction with the drawings.

Figure 1:
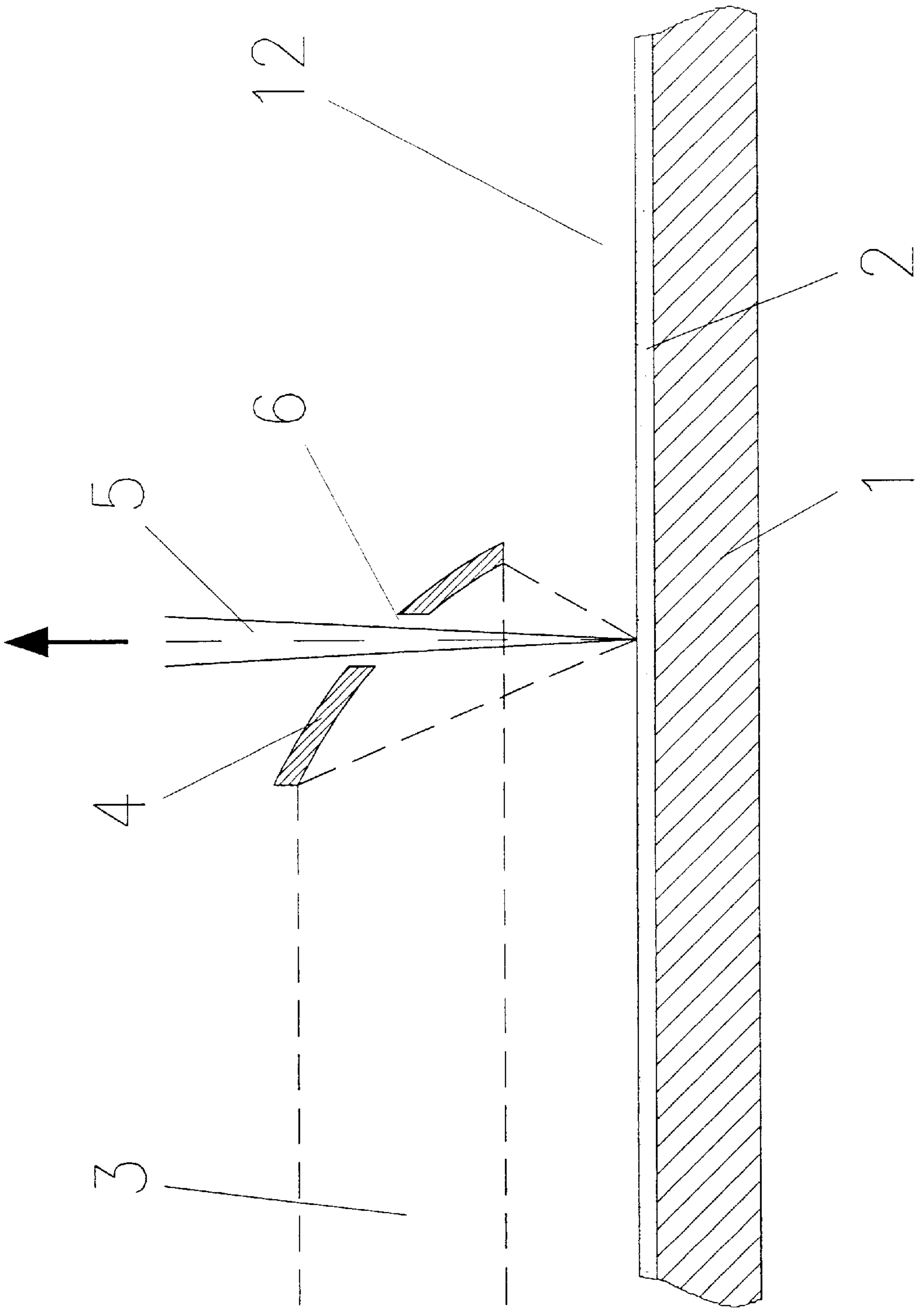
FIG. 1 shows a first embodiment of the invention using an off-axis-parabolic mirror for deflecting and focusing the laser beam onto the surface of the sample.

FIG. 1 shows a first embodiment of the invention. Shown here is a sample(12) with substrate(1) and an adsorbant layer(2), which can be e.g. a thin-layer chromatographic plate with its transport layer, silica gel being often used for this transport layer. The beam(3) of a $CO_2$-laser is deflected by an off-axis-parabolic mirror(4) onto a small diameter spot on the surface of the adsorbant layer. The evaporated material(5) can pass through a small opening(6) in the off-axis-parabolic mirror into the mass-spectrometer, which is not shown here.

Figure 2:
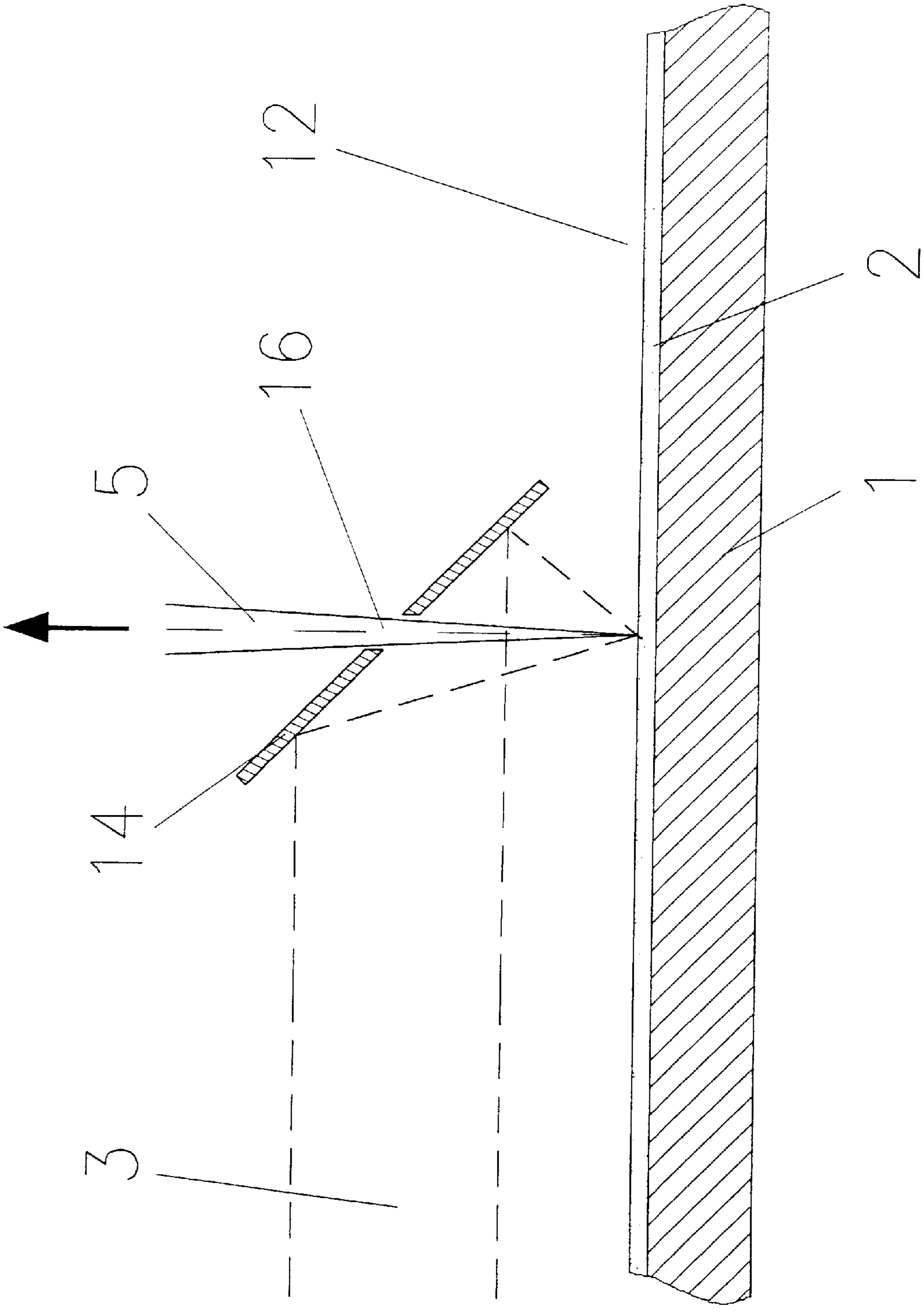
FIG. 2 shows a second embodiment of the invention using a holographic optical element (HOE) for deflecting and focusing the laser beam onto the surface of the sample.
Figure 3:
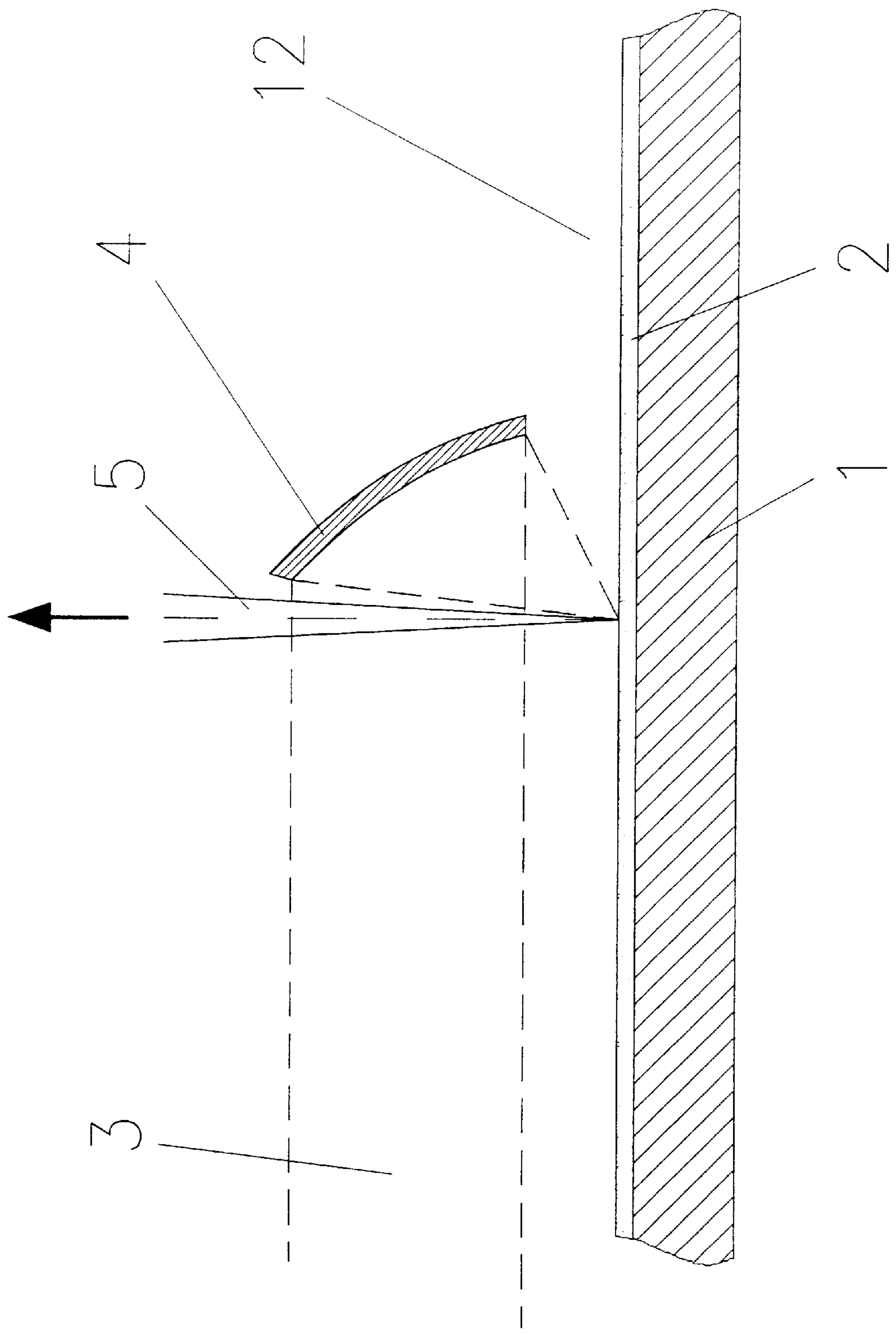
FIG. 3 shows another embodiment of the invention.

FIG. 2 shows the same arrangement as in FIG. 1 with the difference of using a holographic optical element(14) instead of an off-axis-parabolic mirror for simultaneous deflection and focusing of the evaporating laser beam. Like in FIG. 1 the holographic element must also have an opening(16) through which evaporated material(5) can reach the mass-spectrometer, FIG. 3 shows another embodiment of the invention where the mirror(4) deflects the laser beam onto the surface under some angle different from the normal vector of the surface. The evaporated material(5) then passes by the rim of the mirror into the mass spectrometer. Like in the other embodiments, it is also possible to replace the parabolic mirror with a holographic optical element.

Figure 4:
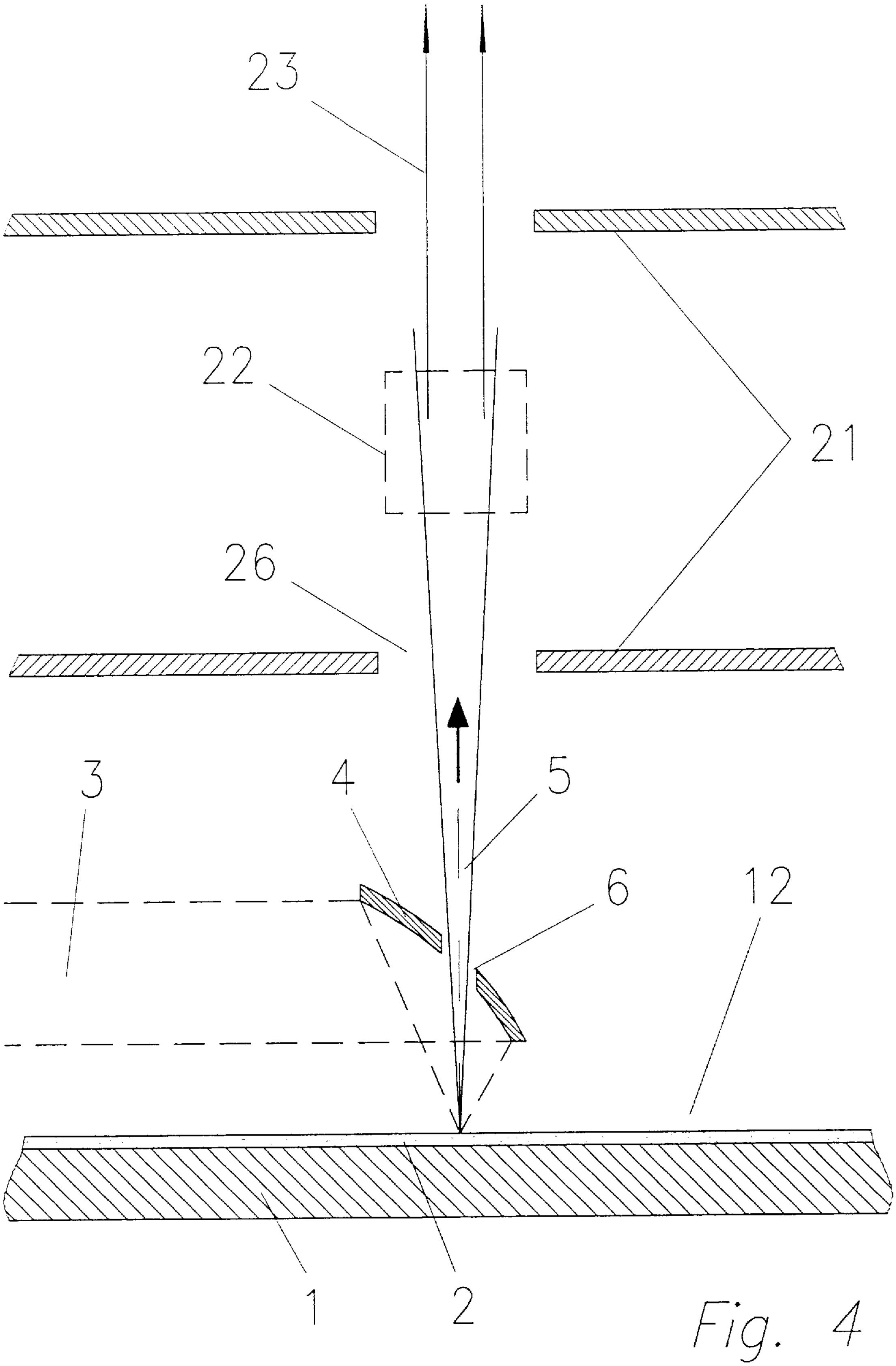
FIG. 4 shows how the invention is arranged behind the ion source of a time-of-flight mass-spectrometer.

FIG. 4 shows how the invention is arranged behind the ion source of a time-of-flight mass-spectrometer. The ion source is shown here just schematically with two electrodes(21). The rear electrode again must have a opening(26) through which the analyte substances can reach the extraction volume(22) of the ion source, where they can e.g. be ionized by a pulsed laser or electron beam. After ionization the analyte substances can be detected as ions(23) in the time-of-flight mass-spectrometer.

If ions are already created within the adsorbant layer of the sample or are created during the process of evaporation, no electrical fields must hinder their movement from the sample surface to the extraction volume of the mass-spectrometer. This is done by keeping all electrodes at ground potential while the ions move from the sample surface to the extraction volume. Once they have reached the extraction volume, the ions can be started on their mass analysis path in the mass-spectrometer by switching all electrodes to their operative potentials.

What is claimed is:

1. Apparatus for the mass-spectrometric analysis of substances contained in the surface of a solid state sample(12), comprising a mass-spectrometer for the analysis of substances(5) evaporated by the interaction of a laser beam (3) with the surface of said sample, characterized by a mirror(4,14) which simultaneously deflects and focuses the laser beam onto the surface of said sample, said laser beam striking said mirror in a direction essentially parallel to the surface of said sample, said mirror being arranged in a manner, that the radiation of the converging laser beam striking the surface of the sample contains the normal vector of the sample surface, said mirror having an opening(6,16) for the passage of evaporated substances(5) into a mass-spectrometer.

2. Apparatus according to claim 1, characterized by a deflecting mirror, which is a parabolic mirror(4).

3. Apparatus according to claim 2, characterized by a deflecting mirror, which is an off-axis-parabolic mirror(4).

4. Apparatus according to claim 1, characterized by a deflecting mirror, which is a holographic optical element(14) that simulataneously deflects and focuses the radiation of the laser beam onto a focal point on the surface of the sample.

5. Apparatus according to claim 1, characterized by a mass-spectrometer that is a time-of-flight mass-spectrometer.

6. Method for evaporating substances(5) contained in the surface of a solid state sample(12) by a laser beam and the mass-spectrometric analysis of these substances characterized by performing the steps of:

a) using a mirror(4,14) that will simultaneously deflect and focus the laser beam onto a focal point within the surface of the sample, b) arranging said laser beam such that it strikes said mirror in a direction essentially parallel to the surface of the sample, c) arranging said mirror such that the deflected convergent radiation will contain the normal vector of the sample surface, d) providing within said mirror an opening(6,16) for the passage of evaporated substances(5) into a mass-spectrometer.

7. Method according to claim 6, characterized by a sample, said sample comprising a substrate(1) and an adsorbate layer(2), said adsorbate layer containing the analyte substances.

8. Method according to claim 7, characterized by a sample comprising substrate(1) and an adsorbate layer(2), the analyte substances being mixed into some matrix absorbing at the wavelength of the evaporating laser beam, said mixture then being coated as the adsorbate layer onto the surface of the sample.

9. Method according to claim 7, characterized by a sample comprising substrate(1) and an adsorbate layer(2), said substrate and adsorbate layer being formed by a thin-layer chromatographic plate.

* * * * *